United States Patent [19]
Gregor

[11] 3,917,050
[45] Nov. 4, 1975

[54] DISTRIBUTOR WITH DISCHARGE CONVEYORS

[76] Inventor: Vaughn Gregor, 465 Castle Place, Beverly Hills, Calif. 90210

[22] Filed: Feb. 28, 1974

[21] Appl. No.: 446,599

[52] U.S. Cl. .................... 198/37; 198/81; 198/83; 198/220 A
[51] Int. Cl.² ........................................ B65G 43/08
[58] Field of Search .................. 198/32, 78, 81–83, 198/110, 220 A, 220 BA, 220 CA, 220 CC

[56] References Cited
UNITED STATES PATENTS

| | | | |
|---|---|---|---|
| 2,525,847 | 10/1950 | Wood | 198/37 |
| 2,925,184 | 2/1960 | Powischill et al. | 198/82 |
| 3,068,996 | 12/1962 | Musschoot | 198/220 CC |
| 3,080,961 | 3/1963 | Allen et al. | 198/220 CA |
| 3,303,923 | 2/1967 | Davis | 198/81 |
| 3,690,435 | 9/1972 | King et al. | 198/78 |
| 3,712,459 | 1/1973 | Musschoot et al. | 198/220 A |
| 3,731,787 | 5/1973 | Gregor | 198/37 |

Primary Examiner—Evon C. Blunk
Assistant Examiner—Joseph E. Valenza
Attorney, Agent, or Firm—Fulwider, Patton, Rieber, Lee & Utecht

[57] ABSTRACT

A distributor for food products and other bulk material having a plurality of in-line vibratory conveyor sections arranged in end-to-end relation to convey the bulk material along a predetermined path past a plurality of use points, and discharge conveyors mounted on the upstream ends of the conveyor sections for longitudinal vibration therewith, and also to be driven transversely of the conveyor section to discharge material laterally at the use points. In the preferred embodiment, the discharge conveyors are vibratory conveyors mounted for longitudinal vibration with, and transverse vibration relative to, the conveyor sections. In one alternative embodiment, the vibratory discharge conveyors are inclined across the path, and in another, they are endless belts having upper runs extending across extensions of the vibratory conveyor sections and driven by belt drives carried by the conveyor sections. Additional embodiments illustrate a manner of independently mounting a discharge conveyor for vibration in two directions, one discharging reversely and the other discharging laterally. All embodiments use sensors for monitoring the quantity of material available for discharge at each use point and controlling the next upstream unit to supply the demand at each use point.

22 Claims, 10 Drawing Figures

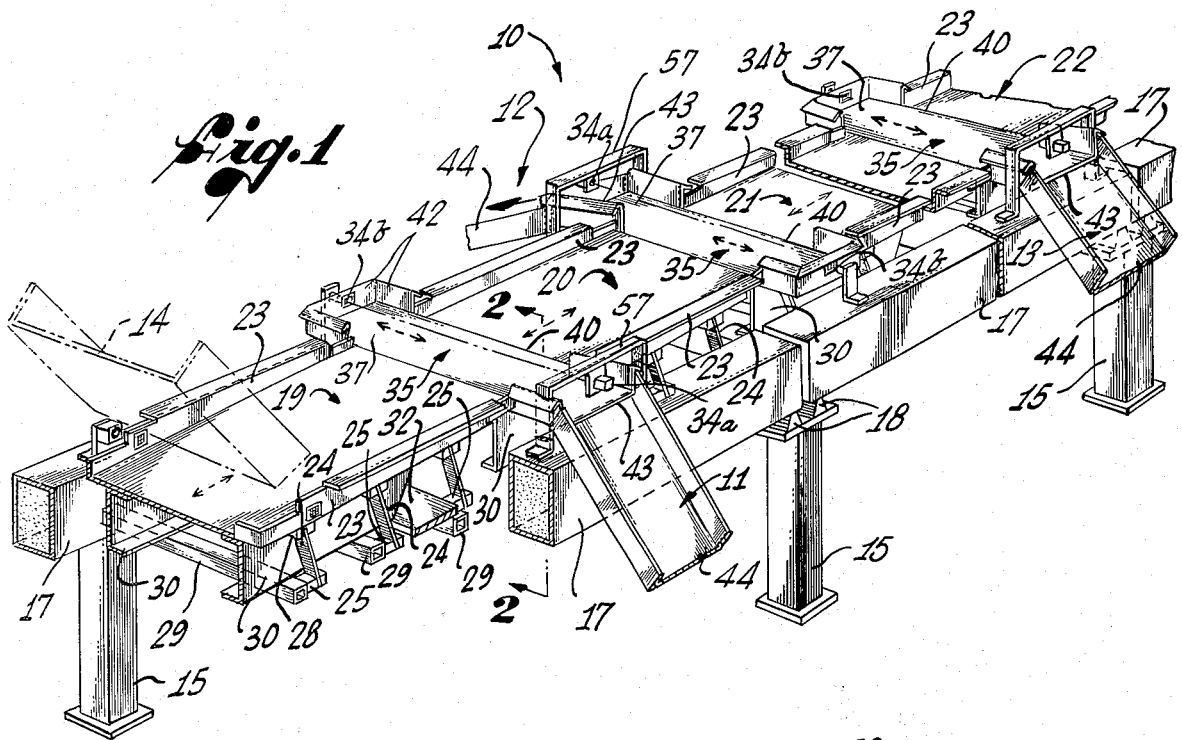
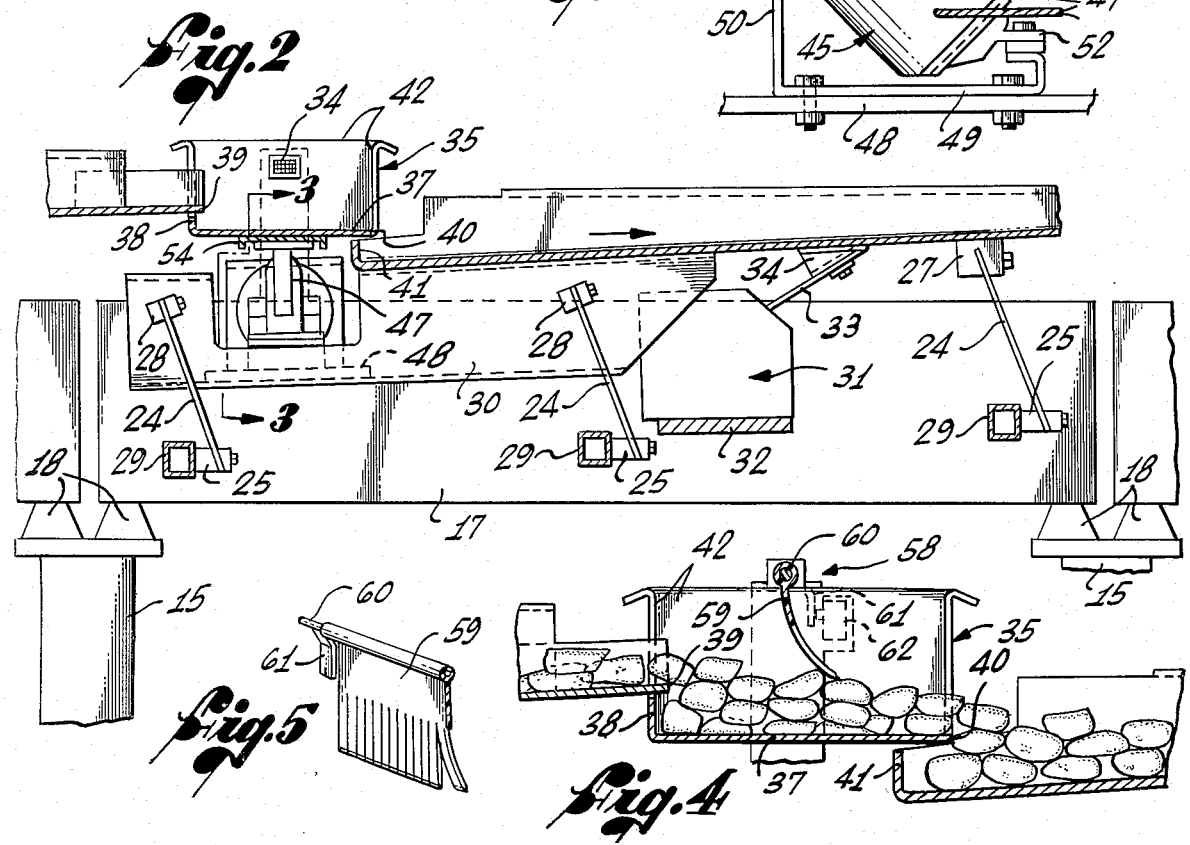

U.S. Patent  Nov. 4, 1975  Sheet 2 of 2  3,917,050
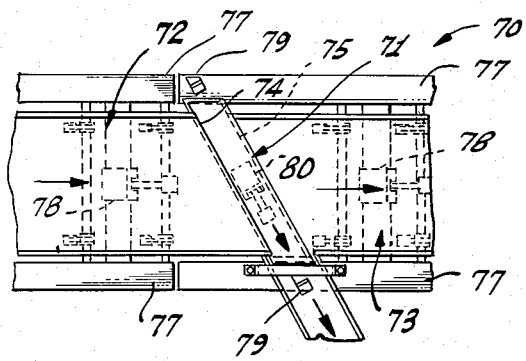
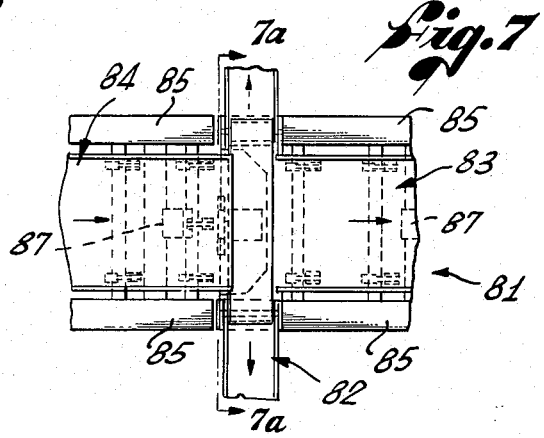
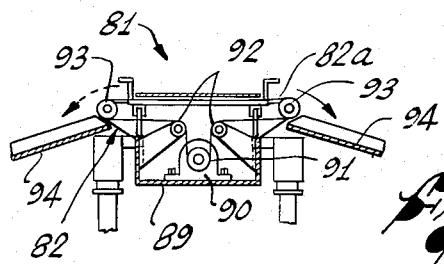
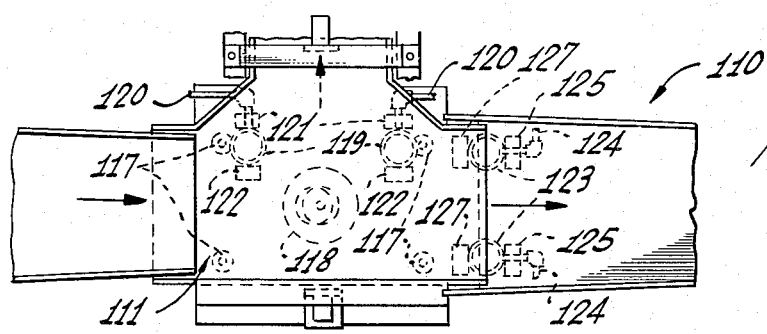
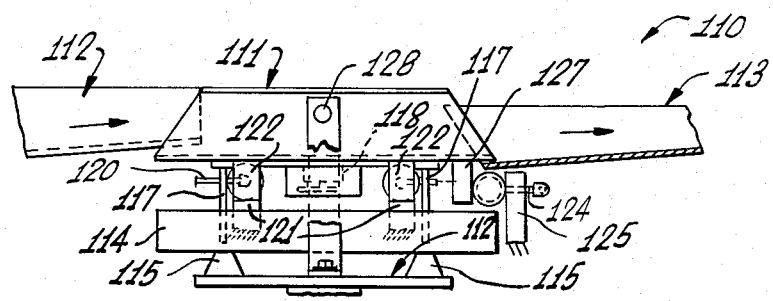

DISTRIBUTOR WITH DISCHARGE CONVEYORS

BACKGROUND OF THE INVENTION

This invention relates to a distributor for supplying material to a plurality of use points and has particular reference to distributing apparatus for receiving bulk material, such as a food product, from a source, and supplying the material to a plurality of processing points, such as packaging machines, having varying demands for the material.

Distributor systems of this general type have been known and used in the past, one such system being shown in U.S. Pat. No. 3,731,787, entitled Modular Distributor System For Bulk Material. As explained in detail in that patent, the distribution of non-free-flowing products of irregular shape has been subject to a number of problems, particularly in the food processing industry where the product being handled often is fragile and physically degradable, and can lose its freshness if exposed to air for excessive periods of time.

The system disclosed in the aforesaid patent comprises a plurality of vibratory conveyor sections having trays arranged in a line, in end-to-end relation, to convey material downstream from a source along a predetermined path, and each having at its upstream end a normally closed, sliding gate for receiving material from the next upstream conveyor tray, and passing material across the gate to the next downstream tray. Associated with each gate is a sensor which monitors the amount of material available on the gate for delivery to a use point, and controls the operation of the upstream conveyor section to maintain a sufficient quantity to meet the demand for material at the use point.

Thus, material from the source is introduced to the system at one end, and is conveyed along the trays and onto and across the successive gates by selective operation of the various conveyor sections. Upon demand at a use point, the gate is opened momentarily to discharge the quantity of material on the gate downward to a chute leading to the packaging machine, and then is closed to receive additional material from the next upstream tray.

This type of system is effective to deliver the material to the use points substantially on a "first-in-first-out basis", and substantially as needed to satisfy the varying demands of the different use points, with a minimum amount of physical degradation of the product. Accordingly, it has offered substantial advantages over conventional systems available for the same general purposes.

The primary objective of the present invention is to provide an improved distributor of the foregoing general character, by increasing the effectiveness and versatility of the distributor with respect to the discharge of material to the various use points, simplifying the maintenance of the distributor in use, particularly from the standpoint of cleaning, and making the distributor more compact in construction.

SUMMARY OF THE INVENTION

The present invention resides in a distributor of the foregoing general type in which the gates previously required have been replaced by selectively operable discharge conveyors which are supported to be driven longitudinally with the longitudinal conveyor sections, so as to constitute portions of the longitudinal conveyor system. At the same time, each of these conveyors can be driven in another direction relative to the longitudinal conveyor sections, to transfer material off the conveyor sections at the use points, as needed to supply the need for material at each use point.

The replacement of the gates with independent discharge conveyors eliminates an area of the distributor where food products can be physically degraded and particles can lodge, and thereby reduces such degradation and the maintenance required to maintain the system in proper operating condition. More importantly, the lateral discharge conveyors make it possible to control and modulate the flows of material to the use points, in contrast to the system in the aforesaid patent which provides intermittent surges of flow as a result of the intermittent opening of the gates. Moreover, the provision of independent discharge conveyors makes discharge chutes beneath the conveyor sections unnecessary, thus making it possible to lower the entire sections for a more compact structure.

More specifically, the presently preferred embodiment of the invention shown and described herein comprises a plurality of vibratory conveyor sections of the type shown in the aforesaid patent, each having a vibratory lateral discharge conveyor supported thereon both for longitudinal vibration with the longitudinal conveyor tray, to feed material longitudinally across the discharge conveyor to the next conveyor section, and for transverse vibration relative to the tray, substantially perpendicular to the path, to discharge material at the use point. A selectively operable vibrator is carried by the longitudinal conveyor tray and coupled to the lateral discharge conveyor to provide the transverse vibratory movement to effect the lateral discharge of material.

The discharge conveyors are supported in gaps between adjacent conveyor trays, in longitudinally overlapped relation therewith, preferably on extensions of the adjacent downstream trays projecting upstream beneath the gap between two trays. The discharge conveyor is supported above this extension on at least one element that is relatively flexible transversely of the conveyor section but relatively inflexible longitudinally thereof, and also is supported by the output element of the vibrator, which also is mounted on the extension of the downstream tray. The sensors for controlling longitudinal vibration of the various conveyor sections are positioned to monitor the quantities of material on the discharge conveyors.

One alternative form of the invention is similar to the preferred form, except that the discharge conveyor is arranged at an angle with the path to discharge material in a transversely inclined fashion. Another embodiment uses a belt conveyor as the lateral discharge conveyor of each conveyor section, the belt being mounted around an extension of the tray with its upper run substantially flush therewith, for longitudinal vibratory movement with the tray. The belt conveyor is driven by a reversible belt drive that also is carried by the tray and is selectively operable to drive the belt relative to the tray to discharge material laterally from the conveyor section, to two use points on opposite sides of the path. It will be apparent that this alternative form of the invention has substantially the same advantages as the presently preferred embodiment from the standpoint of discharge versatility and reduction of degradation of the material being handled, and has the added advantage of discharging to either side, or to both sides.

An additional alternative embodiment illustrates how a discharge conveyor can be independently supported between two conveyor sections and vibrated in two different directions, one to feed material longitudinally along the path when discharging is not called for, and the other in a different direction when material is to be discharged. An oscillatory vibrator creates vibration which is varied as to its effective direction, either to feed material longitudinally or to discharge it laterally, the variation being controlled by pneumatic devices used for vibration isolation.

Other aspects and advantages of the invention will become apparent from the following detailed description, taken in conjunction with the accompanying drawings.

BRIEF DESCRIPTION OF THE DRAWINGS

FIG. 1 is a fragmentary perspective view of a presently preferred distributor system embodying the novel features of the present invention, parts being broken away and shown in cross-section.

FIG. 2 is an enlarged fragmentary cross-sectional view taken substantially along line 2—2 of FIG. 1;

FIG. 3 is a further enlarged fragmentary cross-sectional view taken substantially along line 3—3 of FIG. 2;

FIG. 4 is an enlarged fragmentary cross-sectional view similar to part of FIG. 2 and showing a representative product on the distributor system and an alternative form of a sensor for monitoring the quantity of the product;

FIG. 5 is a perspective view of part of the alternative sensor;

FIG. 6 is a fragmentary plan view, in somewhat diagrammatic form, illustrating the basic elements of an alternative embodiment of the invention in which the discharge conveyor is an inclined vibratory conveyor;

FIG. 7 is a plan view similar to FIG. 6 illustrating the basic elements of another alternative embodiment in which the discharge conveyor is an endless belt conveyor;

FIG. 7a is a fragmentary cross-sectional view taken along line 7a— 7a of FIG. 7;

FIG. 8 is a fragmentary plan view similar to FIGS. 6 and 7 illustrating the basic elements of another alternative embodiment in which an independently supported vibratory discharge conveyor is selectively controlled for either longitudinal feeding or transverse discharge; and FIG. 9 is a fragmentary side elevational view of the embodiment in FIG. 8.

DETAILED DESCRIPTION OF THE PREFERRED EMBODIMENT

(FIGS. 1-5)

As shown in the drawings for purposes of illustration, the invention is embodied in a distributor, indicated generally by the reference number 10, for conveying bulk material from a source (not shown) to a plurality of use points, three such use points being indicated generally in FIG. 1 by the reference numbers 11, 12 and 13. While the distributor 10 may be used for the distribution of a wide variety of products and with sources and use points of different types, one representative use is the packaging of a food product such as potato chips, which are supplied by a processing source such as an oven, often through a surge storage unit, and delivered to the upstream end of the distributor, as by a chute 14 shown schematically in broken lines in FIG. 1. At each of the use points, the product is discharged, upon demand, to a machine (not shown) for packaging measured quantities of the product in bags of selected sizes.

In general, the distributor 10 is mounted on a supporting framework which herein includes two rows of upright posts 15 and two parallel rows of horizontal rails 17 supported on top of the posts along opposite sides of the distributor, the rails of each row being supported on the posts by resilient cushions 18 (FIG. 2) and spaced from each other to prevent the transmission of vibration from one rail to the next. A plurality of vibratory conveyor sections 19, 20, 21 and 22 are arranged in end-to-end relation between the rails 17 and are supported thereon for longitudinal vibratory movement, parallel to the rails, to advance material along the path defined by the conveyor sections, from left to right as viewed in FIGS. 1, 2 and 4.

As shown most clearly in FIGS. 1 and 2, each such conveyor section includes an elongated tray having a flat, upwardly facing conveying surface that is bounded on opposite longitudinal sides by upright flanges 23, and each tray is supported between two of the rails 17 by means of several elongated leg springs 24 that are anchored at their lower ends in clamps 25 on the inner sides of the rails. The leg springs 24 are inclined upwardly and to the left to similar clamps 27 and 28 (see FIG. 2) adjacent the underside of the conveyor section. Herein, three such leg springs are provided to support each side of each conveyor section, as can be seen in FIG. 2, the springs being relatively thin in cross-section longitudinally of the distributor, for resilient longitudinal flexing, while being much wider transversely of the distributor, so as to be virtually inflexible in this direction.

In this instance, the rails 17 supporting each conveyor section 19, 20, 21 and 22 are tied together beneath the conveyor section by transverse bars 29 on which the lower clamps 25 are mounted, and the upper clamps 27, adjacent the downstream end of each conveyor tray, are fastened directly to the underside of the tray. The other two upper clamps 28 on each side of each tray are mounted on the outwardly facing sides of two laterally spaced, longitudinally extending channels 30 which are secured to the underside of the upstream end portion of the tray and project to the left therefrom beyond the upstream end.

To vibrate each conveyor section when material is to be advanced thereon, a conventional vibrator 31 (FIG. 2) is mounted beneath the tray, herein on a tie plate 32 spanning the two supporting rails 17. The movable output element 33 of the vibrator is inclined upwardly and downstream from the vibrator, substantially perpendicular to the leg springs 24, and is connected to a bracket 34 fastened to the underside of the tray.

Thus, vibratory movement is imparted to each tray by the vibrator 31 of that conveyor section, through the output element 33, to vibrate the tray in a well known manner which advances material along the tray from left to right, and feeds the material off the right end of the tray to the use point beyond the downstream end of the tray. In general, such vibration kicks the material upwardly and forwardly and then moves the tray back beneath the material while it is out of contact with the tray.

As in the distributor shown in the aforesaid patent, each tray preferably is inclined slightly upwardly toward its downstream end, and the upstream end of each tray is below the end of the next adjacent upstream tray, to form wells beyond the downstream ends for holding quantities of material ready for discharge. A sensor 34 is provided to monitor the quantity of material available for discharge to each use point, and to control the operation of the next upstream conveyor section to feed material to the use point.

In accordance with the present invention, a discharge conveyor 35 is incorporated in the distributor 10 at each use point, and power-operated means are provided for driving these conveyors in a direction different from the longitudinal conveyor sections, and independently of each other, to discharge material from the main longitudinal flow on the distributor to the various use points. Preferably, each discharge conveyor that is disposed upstream from a vibratory conveyor tray is supported for longitudinal vibratory movement with a tray, as well as for independent operation relative to the tray, so as to be vibrated longitudinally to advance material through the use point to supply the downstream portion of the line, whenever the tray is vibrating.

In the preferred embodiment shown in FIGS. 1 through 4, the lateral discharge conveyors 35 are vibratory conveyors that are mounted on the conveyor sections for transverse vibratory movement relative to the trays. Each of these conveyors includes a substantially flat and horizontal plate 37 that extends across the full width of the trays and has an upturned upstream edge portion 38 (FIGS. 2 and 4) disposed beneath the downstream end 39 of one tray, and a downstream edge 40 which overlies the upstream end 41 of the other tray. The upstream ends 41 of the trays also are formed as upturned flanges for preventing loss of material therefrom.

Preferably, a U-shaped flange 42 surrounds one end of each lateral conveyor plate 37, outside the adjacent side flanges 23 of the trays, to prevent discharge of material from that end, and the other end of the conveyor plate extends laterally to a free discharge edge 43 from which material is released at the use point. For purposes of illustration, this edge is shown as overlying a downwardly and laterally inclined chute 44 for feeding the discharged material to a packaging machine (not shown). To illustrate the versatility of the distributor 10, the discharge conveyor 35 for the use point 12 is shown as discharging to the opposite side from the others, although it would be customary to discharge on the same side at all use points.

As shown in FIGS. 2 and 3, the conveyor plate 37 is supported in the gap between two vibratory trays by means of a laterally flexible, and a longitudinally inflexible, mounting assembly comprising a vibrator 45 and a leg spring 47, both mounted on a tie plate 48 spanning the two channels 30 (not shown in FIG. 3) which extend upstream from the underside of the downstream tray. The vibrator 45 is supported in an upwardly and laterally inclined position on an L-shaped mount (see FIG. 3) having one flat leg 49 resting on and bolted to the tie plate 48, and a second leg 50 extending upwardly toward the conveyor plate 37 at a right angle with the lower leg, the ends of the legs being formed with inwardly turned flanges to which brackets 51 and 52 on the opposite ends of the vibrator housing are bolted.

The output element 53 of the vibrator 45 projects out of the upper end of the vibrator housing, upwardly and to the left as viewed in FIG. 3, and is fastened to a cross-plate 54 on the underside of the conveyor plate, adjacent the left end of this cross-plate. The leg spring 47 is secured at its lower end to the lower end of the vibrator housing, and is inclined upwardly and to the right therefrom, with its upper end bolted to a V-shaped bracket 55 that is fastened to the cross-plate 54 near the right end thereof.

The leg spring 47 is similar to the springs 24 supporting the conveyor sections on the rails 17, but is positioned to flex transversely and to be virtually inflexible longitudinally of the distributor. Similarly, the output element 53 of the vibrator 45 is movable transversely of the distributor, relative to the vibrator housing, when the vibrator is in operation, but is virtually immovable longitudinally. Thus, the vibrator and the leg spring 47 of each discharge conveyor support the conveyor plate 37 thereof for longitudinal vibratory movement with the associated conveyor tray and for transverse vibratory movement relative to the tray.

The sensors 34 for monitoring the quantity of material available at each discharge conveyor may take various forms, two alternatives being shown in FIGS. 1, 2, 4 and 5. The first form, shown in FIGS. 1 and 2, is a photoelectric sensor having transmitting and receiving elements 34a and 34b, respectively, which are spaced apart across the discharge conveyor at a predetermined level above the conveying plate 37 so that a light beam from the transmitting element will be interrupted by the material on the conveying plate when this material is stacked up on the plate to the predetermined level. The interruption of the beam is sensed at the receiving element 34b, which produces an electrical signal for deenergizing the vibratory 31 of the next upstream conveyor section.

In this instance, the receiving elements 34b of the sensor are mounted on the flanges 42 closing the ends of the discharge conveyors, and the transmitting elements 34a are mounted on bars 57 that are supported on posts, above the discharge end portions of these conveyors, in horizontal alignment with the receiving elements. When the level of material is reduced to below the level of the light beam as a result of movement of material off the conveying plate, either laterally or longitudinally, the beam strikes the receiving element, and the latter creates an electrical signal which energizes the vibrator 31 of the next upstream conveyor section to resume feeding of the material onto the discharge conveyor.

The alternative sensor 58 shown in FIGS. 4 and 5 accomplishes the same results by physically feeling the level of material on the discharge conveyor. This sensor has a flexible sheet 59, preferably with a slitted lower edge portion, which hangs below a transverse supporting rod 60 for engagement with material on the conveyor plate, to be deflected downstream, to the right in FIG. 4, by the material advancing along the distributor. The rod is rotatably supported at its ends, and carries a switch-actuating arm 61 adjacent one end that is positioned beside a normally closed switch 62 to engage the actuating button of the switch upon the rotation of the rod (counterclockwise in FIG. 4) produced by downstream deflection of the sensing sheet 59.

When the sheet 59 hangs straight down from the rod 60, the switch arm 61 is positioned to the left of the actuating button of the switch 62, and the switch is closed to complete an energizing circuit to the next upstream vibrator 31. When the material on the conveyor plate 37 reaches a sufficient depth to deflect the sensing sheet 59 to the position shown in FIG. 4, the rod 60 is rotated counterclockwise by the sheet, to swing the arm 61 against the button of the switch 62, thereby opening the switch and deenergizing the controlled vibrator 31.

Accordingly, each sensor is effective to constantly monitor the level of material available for delivery at a use point, and to control the delivery of material to the discharge conveyor for discharge to the use point. Functionally similar sensors (not shown) typically will be associated with the further processing equipment serviced at the use points, to demand material from the associated discharge conveyors when there are insufficient amounts of material at the inputs of the using equipment. The signals from these sensors thus activate and deactivate the vibrators 45 of the discharge conveyors to control the discharge of material from the distributor to the using equipment.

Alternatively, the discharge conveyors may be operated substantially continuously, with a modulated discharge rate selected to supply a constant flow at each use point. In this mode of operation, sensors at the inputs of the using equipment may be included as overriding shut-off controls on the vibrators.

It will be apparent that the terminal sections of the distributor system may be modified because of their special positions in the system. At the upstream end of the line, the first use point may be supplied by a discharge conveyor (not shown) fed directly by the chute, for example, from a surge storage unit which is activated to supply material to a sensor beneath the chute. Similarly, at the downstream end of the line, the last use point (not shown) may be supplied by a discharge conveyor that does not vibrate longitudinally, since there will be no additional conveyor sections to be fed beyond this discarge conveyor. To block further longitudinal movement of material, the terminal discharge conveyor should have an end wall extending across its downstream edge.

The conveyor sections 19, 20, 21 and 22 shown herein for purposes of illustration are basically of the type shown in the patent previously mentioned, which have been commercially available (with gates) from Aseeco Corporation, Los Angeles, California as MVS and MVH Modular Vibrators, having standard Aseeco eccentric drives for the longitudinal vibrators 31. Various types of transverse vibrators 45 may be used, one suitable type being the electromagnetic vibrator sold by Eriez Manufacturing Company, Erie, Pennsylvania, as model 45A. It will be apparent to those skilled in the art, however, that the vibrators may be mechanical or pneumatic, as well as electromagnetic.

In operation, material to be distributed is supplied by the source to the upstream end of the distributor and, because there initially is no material at any of the use points, the sensors activate all of the vibrators 31 to convey material along the line of trays until the entire line has been filled and the vibrators 31 have been deactivated by their associated sensors.

When the discharge conveyors are operated only upon demand, each vibrator 45 is activated to discharge material whenever the sensor of the using equipment signals a need for more material, and as long as the need continues. At the same time, depletion of the quantity of material on the discharge conveyor results in activation of the next upstream conveyor section to advance material along the line. Through the mutual interaction of the various sensors and vibrators, material is fed intermittently along the various sections of the line as necessary to supply each of the use points, and is discharged at each use point, as necessary to satisfy the demands of the using equipment.

DETAILED DESCRIPTION OF ALTERNATIVE EMBODIMENTS

(FIGS. 6–9)

Although the preferred embodiment has been found to be a highly satisfactory form of the invention, alternative embodiments are illustrated basically in FIGS. 6–9 to show variations that can be made within the scope of the broader aspects of the invention, and for special-purpose situations. Only the basic components of these embodiments are described herein, because details of construction and operation will be apparent to those skilled in the art having the benefit of the description of the preferred embodiment.

Shown in FIG. 6 is a portion of a distributor 70 in which the discharge conveyors 71 (one being shown) are inclined across the path of longitudinal flow of material, from left to right. The adjacent conveyor sections 72 and 73 have correspondingly inclined end edges 74 and 75, which are longitudinally overlapped with the discharge conveyor, as in the first embodiment. The conveyor sections 72 and 73 are supported between two rows of rails 77, are selectively vibrated by longitudinal vibrators 78, and are controlled by sensing elements 79 monitoring the level of material on the next-downstream discharge conveyor.

The discharge conveyors are virtually identical to those in FIGS. 1–4, except for their angles relative to the longitudinal path of the material, and are selectively vibrated by individual vibrators 80 to discharge material laterally from the distributor 70.

Shown in FIGS. 7 and 7a is a portion of a distributor 81 in which the discharge conveyor 82 (one being shown) is a belt conveyor that vibrates with the next-down-stream vibratory conveyor section 83 and can be selectively driven to discharge material from the distributor 81. This belt conveyor may be driven to discharge in only one direction, or as shown here, can be reversibly driven for selective discharge to either side.

Specifically, the illustrative portion of the distributor 81 comprises two vibratory conveyor sections 83 and 84 supported on two rows of rails 85 and independently vibrated by vibrators 87, as before. The upstream section 84 has a downstream end 88 overlying the belt conveyor 82, and the latter has an upper run 82a extending transversely across an extension constituting the upstream end of the next downstream section 83.

Beneath this extension is a supporting structure 89 projecting upstream from the conveyor section 83, as did the channels 30 shown in FIG. 2. A motor 90 for driving the belt is mounted on this structure, and has a drive pulley 91 around which the conveyor belt 82 is trained. It can be seen in FIG. 7a that the belt is trained around two guide pulleys 92 above the motor, and around two additional supporting pulleys 93 at the ends of the upper run, supporting the latter to pass across the extension of the conveyor section 73.

With this arrangement, the belt 82 constitutes an active section of the longitudinal conveyor line, and also can be driven transversely by the motor 90 to discharge material from the distributor 81. In this instance, a chute 94 is provided at each end of the upper run 82a of the belt, and the motor is of the reversible type that can drive the belt in either direction.

The last embodiment, shown in FIGS. 8 and 9, illustrates another distributor 110 with an independently supported discharge conveyor 111 that is capable of controlled vibratory movement to feed material in two different directions. This discharge conveyor is between two vibratory conveyor sections 112 and 113, in longitudinally overlapped relation therewith, and is capable of feeding material downstream, to the right, or laterally off the distributor, upwardly as viewed in FIG. 9.

For these purposes, the discharge conveyor 111 again is supported on a pedestal 112, carrying a frame 114 on cushions 115, and is movably supported on the frame by means of four rod-like leg springs 117 which can flex both longitudinally and transversely with equal freedom. Suspended from the underside of the discharge conveyor 111 is an oscillatory vibrator 118 of the off-balance mass type which, when driven, creates undirected vibration generally in a horizontal plane.

To control and direct this vibration, either longitudinally for feeding of material along the distributor 110 or laterally for discharge of material to a chute (not shown), vibration-isolating assemblies are provided for selectively blocking vibration in one direction or the other. These may be pneumatically activated, "air-bag" type of pneumatic mounts that are available from the Firestone Tire & Rubber Company.

More specifically, there are two or more air-bags 119 which, when inflated through air lines 120, act between upstanding bars 121 on the frame 114 and depending lugs 122 on the discharge conveyor, to block transverse vibration while permitting longitudinal vibration. Similarly, there are two or more air bags 123 which, when inflated through lines 124, act between upstanding stationary bars 125 and depending lugs 127 on the discharge conveyor 111 to block longitudinal vibration while permitting transverse vibration.

Thus, by controlling the inflation and deflation of the two sets of air bags 119 and 123, the vibration produced by the oscillatory vibrator 118 can be directed, to produce the direction of flow of material desired. Again, a sensor 128 monitors the level of available material on the discharge conveyor 111 and controls the operation of the next upstream conveyor section 112.

It is to be understood that some of these alternative embodiments do not have the full capabilities of the preferred embodiment, and also are more complex in structure and less effective as distributors. At the same time, all of them will be capable of performing the basic distribution functions.

It also will be apparent that, while several embodiments have been specifically described, various modifications and changes may be made in each without departing from the spirit and scope of the invention.

I claim:

1. In a distributor system for conveying material from a source to a plurality of use points spaced apart along a predetermined path, and including:
    a plurality of longitudinally extending vibratory conveyor sections arranged in end-to-end relation along said path and each including a tray supported for longitudinal vibratory movement, said use points being located adjacent the downstream end of the tray;
    power-operated means for vibrating each of said trays independently of the other trays, longitudinally of said path, to advance material thereon along said path from the upstream end of the conveyor section along the tray toward a use point and toward the next downstream conveyor section; and
    sensor means for monitoring the quantity of material available for delivery to each use point and controlling the power-operated vibrating means of the adjacent upstream tray to move material thereon downstream along the tray when the quantity of material at the use point is below a selected level;
    the improvement which comprises:
        transversely extending vibratory discharge conveyors positioned at the downstream ends of said trays to receive material from the next upstream trays, said vibratory discharge conveyors having conveying surfaces extending longitudinally of said path to convey material between adjacent trays, and also extending transversely of said path to discharge material therefrom;
        means supporting said vibratory discharge conveyors on said conveyor sections for longitudinal vibratory movement with the adjacent downstream trays, to advance material longitudinally of said path across each of said conveying surfaces when the adjacent downstream tray is being vibrated by said power-operated means, whereby said conveying surfaces constitute extensions of said trays and define portions of said path;
        means supporting said conveying surfaces on said conveyor sections for vibratory movement transversely of said path relative to said conveyor sections; and
        selectively operable means for vibrating each of said conveying surfaces, transversely of said path and relative to the conveyor section upon which it is supported, to discharge material laterally from said distributor system at said use points, said selectively operable means being carried by said conveyor sections for longitudinal vibration with the trays thereof.

2. A distributor system is defined in claim 1 in which said trays are supported in longitudinally spaced relation with gaps between their adjacent ends, and said vibratory discharge conveyors are disposed in said gaps in overlapped relation with the adjacent trays, with the upstream edge portion of the conveying surface thereof underlying the end of an upstream tray and with the downstream edge portion of the conveying surface overlying the upstream end of a downstream tray.

3. A distributor system as defined in claim 2 in which said supporting means comprise a substructure secured to the upstream end of the downstream tray and extending upstream beneath the gaps, and at least one transversely flexible and longitudinally inflexible supporting element connected between said substructure and said conveying surface.

4. A distributor system as defined in claim 3 in which said selectively operable vibrating means are vibrators supported on said substructures and having output elements forming part of the supporting means for said conveying surfaces.

5. A distributor system as defined in claim 1 in which said trays have side flanges for confining material to said path, and each of said vibratory discharge conveyors has a flange at one end for confining material against discharge on one side of said path, the other end thereof being open for discharge of material on the other side of said path.

6. A distributor system as defined in claim 5 in which said sensor means include photo-electric transmitting and receiving elements supported adjacent the opposite ends of said discharge conveyors and spaced a preselected distance above the conveying surfaces thereof, one of said elements being supported on the end flange and the other above the open end.

7. A distributor system as defined in claim 1 in which said discharge conveyors are substantially perpendicular to said path.

8. A distributor system as defined in claim 1 in which said discharge conveyors are inclined to one side and downstream relative to said path.

9. In a distributor system for conveying material from a source to a plurality of use points spaced apart along a predetermined path, and including:
  a plurality of vibratory conveyor sections arranged in end-to-end relation and extending longitudinally along said path; and
  power-operated means for vibrating each of said conveyor sections longitudinally to advance material thereon longitudinally in one direction along said path from one conveyor section toward the next and toward successive use points adjacent the ends of successive conveyor sections;
  the improvement which comprises:
    discharge conveyors disposed at said use points between the adjacent ends of successive conveyor sections along said path and each having a conveying surface positioned to receive material from the next upstream conveyor sections and to carry the material longitudinally along said path to the next downstream conveyor section;
    means supporting each of said discharge conveyors on one of said two successive conveyor sections for longitudinal vibration therewith, thereby to advance material longitudinally across the discharge conveyor to the next downstream conveyor section; and
    selectively operable means for driving each discharge conveyor relative to the conveyor section on which it is supported, in a direction different from said one direction, to transfer material off said path at said use point.

10. A distributor system as defined in claim 9 in which said discharge conveyors are vibratory conveyors;
  said supporting means comprise elements supporting said conveying surface on said one conveyor section and are capable of flexing transversely of said path; and
  said selectively operable means comprise a vibrator carried by said one conveyor section and coupled to said conveying surface to vibrate the latter transversely when said vibrator is activated.

11. A distributor system as defined in claim 10 in which one of said vibratory conveyors, one of said supporting means, and one of said selectively operable means, are provided at each of said use points, and sensor means are provided at each of said vibratory conveyors for monitoring the quantity of material available on the conveying surface and controlling the power-operated means of the next upstream conveyor section to move material thereon toward the conveying surface when said quantity is below a selected level.

12. A distributor system as defined in claim 10 in which said discharge conveyors are supported to vibrate substantially perpendicular to said conveyor sections.

13. A distributor system as defined in claim 10 in which at least some of said discharge conveyors are inclined downstream and laterally across said path, and are supported to vibrate in a correspondingly inclined direction.

14. A distributor system as defined in claim 9 in which said discharge conveyor is a belt conveyor having an upper run extending transversely across said one conveyor section;
  said supporting means comprise an extension of said one conveyor section beneath said upper run for vibrating said upper run with said one conveyor section; and
  said selectively operable means comprise a belt drive mounted on said one conveyor section and drivingly coupled to said belt conveyor.

15. In a distributor system for conveying material from a source to a plurality of use points spaced apart along a predetermined path, and including:
  a plurality of vibratory conveyor sections arranged in spaced, end-to-end relation and extending longitudinally along said path and each leading to one of said use points; and
  power-operated means for vibrating each of said conveyor sections independently to advance material thereon longitudinally in one direction along said path toward the next use point;
  the improvement which comprises:
    a vibratory discharge conveyor at the end of each of said conveyor sections adjacent one of said use points and having a conveying surface for receiving material from the next upstream conveyor section, each conveying surface between two of said conveyor sections defining a portion of said path to carry material longitudinally of said path from one conveyor section to the next;
    first means for vibrating said conveying surfaces in one direction, longitudinally of said path, to advance material along said path and across the spaces between adjacent conveyor sections, said first means comprising extensions of one of said conveyor sections adjacent each discharge conveyor and supporting the latter for longitudinal vibration with said one conveyor section; and
    second means for vibrating said discharge conveyors to transfer material in a different direction from said path and off said distributor system at said use points.

16. A distributor system as defined in claim 15 in which said second means comprise independent vibrators for said discharge conveyors, for vibrating the conveying surfaces of the latter to advance material in said different direction.

17. In a distributor system for conveying material from a source to a plurality of use points spaced apart along a predetermined path, and including:
  a plurality of vibratory conveyor sections having trays arranged in spaced, end-to-end relation and extending longitudinally along said path and each leading to one of said use points; and
  power-operated means for vibrating the tray of each of said conveyor sections independently to advance material thereon longitudinally in one direction along said path toward the next use point;
  the improvement which comprises:

a discharge conveyor at the end of each of said conveyor sections adjacent one of said use points comprising an endless belt having an upper run forming a conveying surface for receiving material from the next upstream conveyor section, each conveying surface between two of said conveyor sections defining a portion of said path to carry material longitudinally of said path from one conveyor section to the next;

each of said discharge conveyors being mounted on one of said conveyor sections for longitudinal vibration therewith to advance material along said path and across the spaces between adjacent conveyor sections; and second means in the form of selectively operable belt drives for driving said discharge conveyors to drive said upper runs transversely of said path and transfer material off said distributor system at said use points.

18. A distributor system as defined in claim 17 in which said belt drives include reversible motors for driving said belts to move said upper runs in opposite directions transversely of said path.

19. A distributor system as defined in claim 17 in which each of said upper runs extends across the upper surface of an extension of the tray of the next downstream conveyor section, and is disposed beneath the downstream end of the next upstream tray.

20. In a distributor system for conveying material from a source to a plurality of use points spaced apart along a predetermined path, and including:

a plurality of elongated vibratory conveyor sections arranged in spaced, end-to-end relation and extending longitudinally along said path and each leading to one of said use points; and power-operated means for vibrating each of said conveyor sections independently to advance material thereon longitudinally in one direction along said path toward the next use point;

the improvement which comprises:

a vibratory discharge conveyor at the end of each of said conveyor sections adjacent one of said use points and having a conveying surface for receiving material from the next upstream conveyor section, said conveying surfaces being disposed in the spaces between adjacent conveyor sections and defining portions of said path to carry material longitudinally of said path from one conveyor section to the next;

means supporting said conveying surfaces for feeding vibratory motion in said one direction, longitudinally of said path, to advance material along said path and across the spaces between adjacent conveyor sections and also supporting said conveying surfaces for feeding vibratory motion in a plane substantially parallel to the surface to each discharge conveyor and in a direction transverse to said path, to transfer material from said path and off said distributor system at said use points;

and additional power-operated means for vibrating each of said discharge conveyors, and selectively operable to produce vibratory feeding motion in said one direction and in a plane substantially parallel to the surface to each discharge conveyor and in a direction transverse to said path.

21. A distributor system as defined in claim 20 in which said conveying surfaces are supported on longitudinally and laterally flexible supporting elements, and said additional power-operated means includes:

a vibrator for producing undirected vibration;

selectively operable means for directing said vibration longitudinally of said path while preventing transverse vibration; and selectively operable means for directing said vibration transversely of said path while preventing longitudinal vibration.

22. In a distributor system for conveying material from a source to a plurality of use points spaced apart along a predetermined path, and including:

a plurality of vibratory conveyor sections having trays spaced apart in end-to-end relation and extending longitudinally along said path;

means for vibrating said tray to advance material in one direction thereon toward a use point adjacent the downstream end of the tray; and sensing means adjacent the downstream ends of the trays for monitoring the quantities of material available for discharge and operating the vibrating means to advance material on the tray;

The improvement which comprises:

a plurality of discharge conveyors for receiving material from said trays and discharging the material on demand at the use points, said discharge conveyors having conveying surfaces positioned in the spaces between the adjacent ends of adjacent trays, and including means for driving the conveying surfaces longitudinally of said path to advance material from one tray to the next along said path, and means for driving said conveying surfaces transversely of said path to discharge material transversely to one of said use points.

* * * * *